(12) United States Patent
Galloway et al.

(10) Patent No.: US 7,213,360 B1
(45) Date of Patent: May 8, 2007

(54) SCOPE COVER AND WARMING ASSEMBLY

(76) Inventors: Kevin S. Galloway, P.O. Box 854, Rosman, NC (US) 28772; David E. Johnson, P.O. Box 854, Rosman, NC (US) 28772

( * ) Notice: Subject to any disclaimer, the term of this patent is extended or adjusted under 35 U.S.C. 154(b) by 44 days.

(21) Appl. No.: 11/053,609

(22) Filed: Feb. 9, 2005

(51) Int. Cl.
*F41A 35/02* (2006.01)
*B65D 65/02* (2006.01)

(52) U.S. Cl. .............................. 42/96; 42/129; 150/154

(58) Field of Classification Search ................ 42/96, 42/111, 119, 122, 123, 129, 130, 131, 84; 89/1.12; 219/534; 220/903; 150/154
See application file for complete search history.

(56) References Cited

U.S. PATENT DOCUMENTS

| | | | |
|---|---|---|---|
| 2,404,736 A * | 7/1946 | Marick | 219/537 |
| 2,609,479 A * | 9/1952 | Loewe | 219/529 |
| 2,909,838 A * | 10/1959 | Kollmorgen et al. | 42/123 |
| 3,208,146 A | 9/1965 | Nelson | |
| 3,977,113 A | 8/1976 | Howell | |
| 5,150,528 A | 9/1992 | Shire | |
| 5,183,953 A * | 2/1993 | Anderson et al. | 42/96 |
| 5,642,585 A | 7/1997 | Watley | |
| 5,661,920 A * | 9/1997 | Evans | 42/96 |
| 5,850,706 A | 12/1998 | Evans | |
| D445,475 S | 7/2001 | Spear | |

* cited by examiner

*Primary Examiner*—Michael J. Carone
*Assistant Examiner*—Bret Hayes

(57) ABSTRACT

A scope cover and warming assembly includes a tubular covering that includes an open first end, an open second end and a peripheral wall extending between the first and second ends. The covering has an elongated slot therein generally extending from the first end to the second ends. A heating apparatus is attached to the covering and is adapted for heating an area adjacent to the first and second ends. Each of a pair of heat emitters is positioned adjacent to one of the first and second ends. A power supply is electrically coupled to each of the heat emitters. The covering may be removably positioned on a gun scope so that each of the heat emitters abuts an opposite end of the gun scope.

20 Claims, 5 Drawing Sheets

SCOPE COVER AND WARMING ASSEMBLY

BACKGROUND OF THE INVENTION

1. Field of the Invention

The present invention relates to scope cover devices and more particularly pertains to a new scope cover device for protecting the surface of a gun scope and for heating the lenses of the gun scope to prevent fogging of the lenses.

2. Description of the Prior Art

The use of scope cover devices is known in the prior art. U.S. Pat. No. 5,850,706 describes a device for positioning on a gun scope for protecting the scope from scratches and other damage. Another type of scope cover device is U.S. Pat. No. 3,208,146 having a substantially rigid material and which may be selectively lifted or lowered over a scope to protect the scope from damage. Yet another such device is shown in U.S. Pat. No. 5,183,953 which includes a flexible covering that may be positioned on a scope.

While these devices fulfill their respective, particular objectives and requirements, the need remains for a device that is not only used for protecting a surface of a scope, but which utilizes such a covering as a mounting for holding heat emitters on scope to prevent the fogging up of the lenses of the scope.

SUMMARY OF THE INVENTION

The present invention meets the needs presented above by generally comprising a tubular covering that includes an open first end, an open second end and a peripheral wall extending between the first and second ends. The covering has an elongated slot therein generally extending from the first end to the second ends. A heating apparatus is attached to the covering and is adapted for heating an area adjacent to the first and second ends. Each of a pair of heat emitters is positioned adjacent to one of the first and second ends. A power supply is electrically coupled to each of the heat emitters. The covering may be removably positioned on a gun scope so that each of the heat emitters abuts an opposite end of the gun scope.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
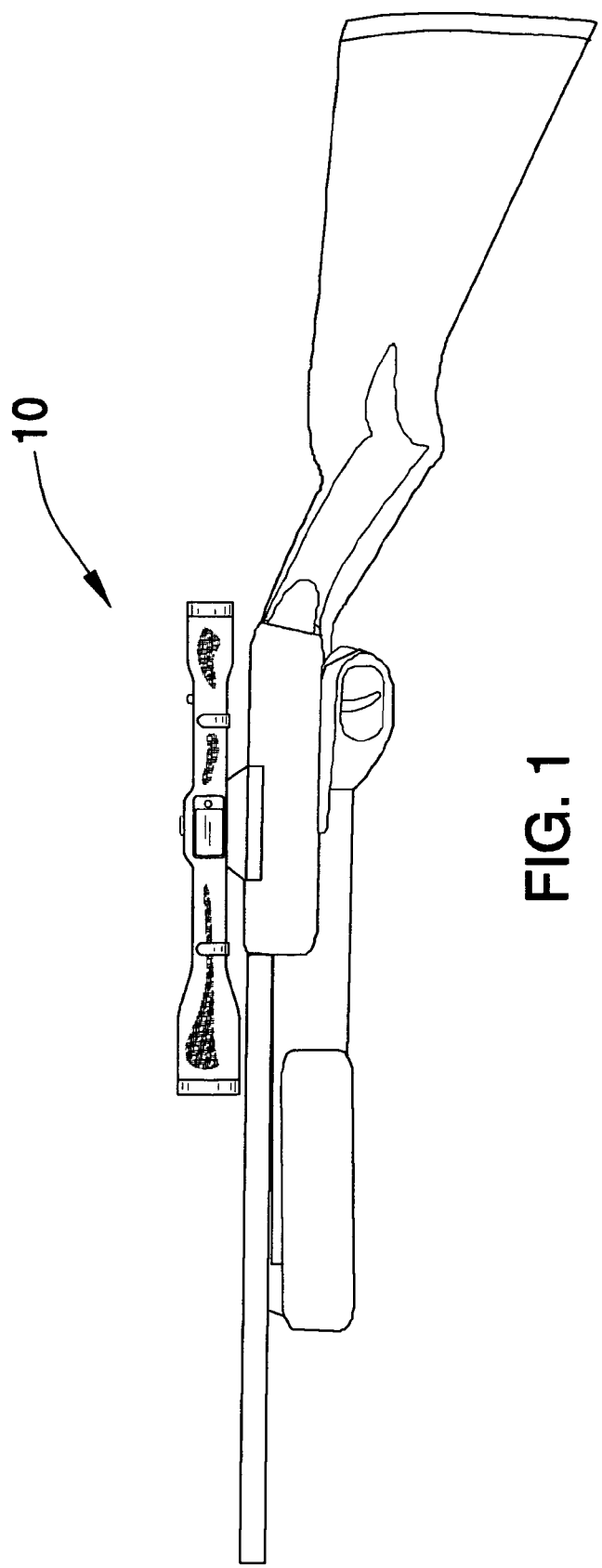
FIG. 1 is a side in-use view of a scope cover and warming assembly according to the present invention.
Figure 2:
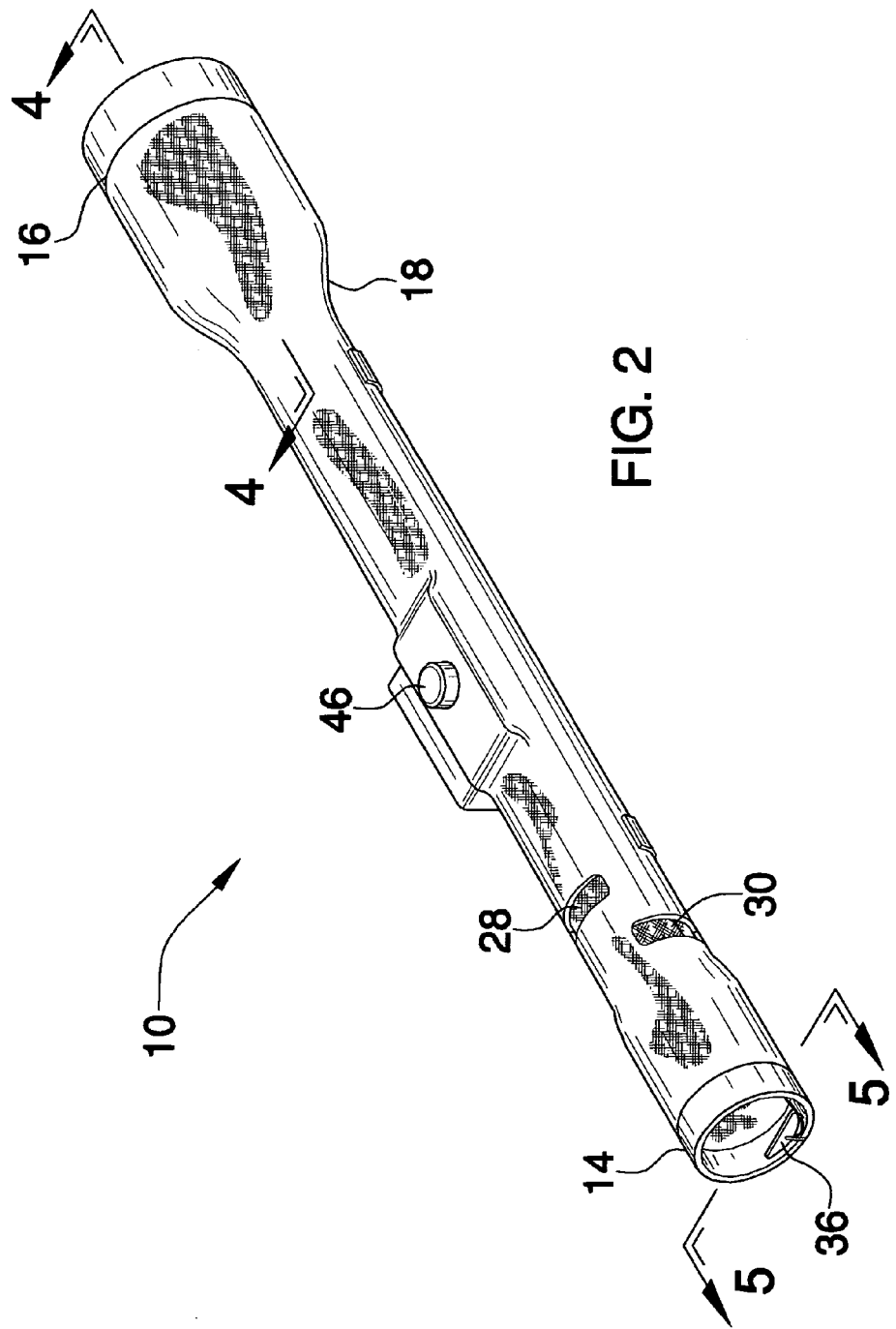
FIG. 2 is a perspective view of the present invention.
Figure 3:
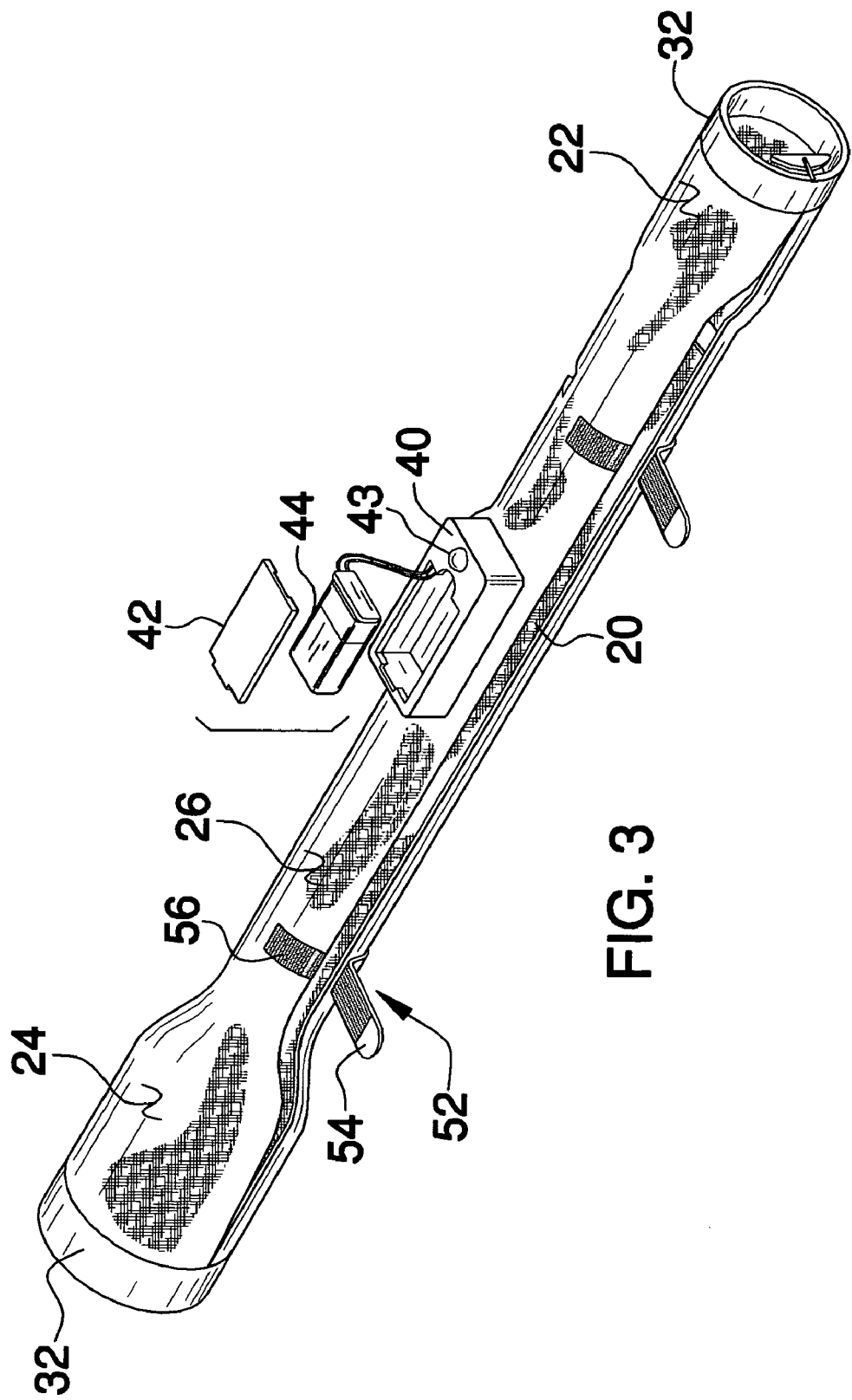
FIG. 3 is a perspective view of the present invention.
Figure 4:
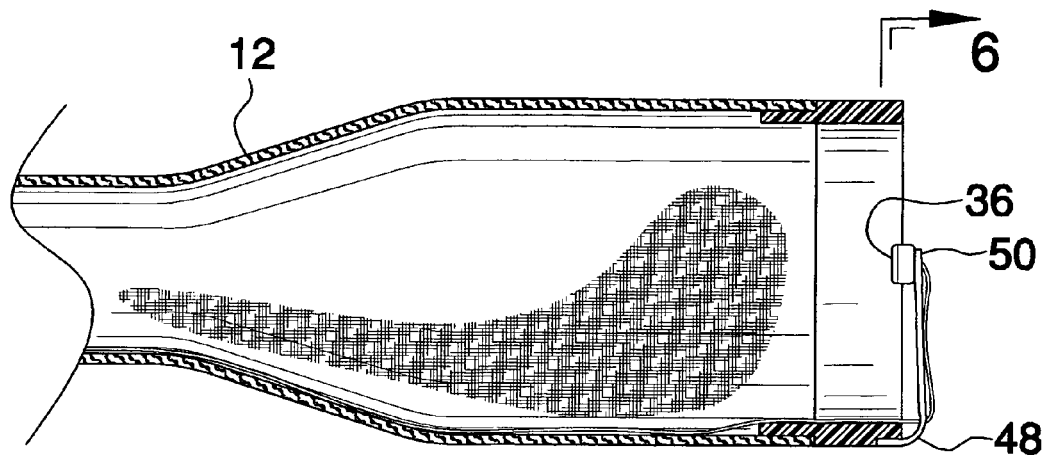
FIG. 4 is a cross-sectional view taken along line 4—4 of FIG. 2 of the present invention.
Figures 5, 6:
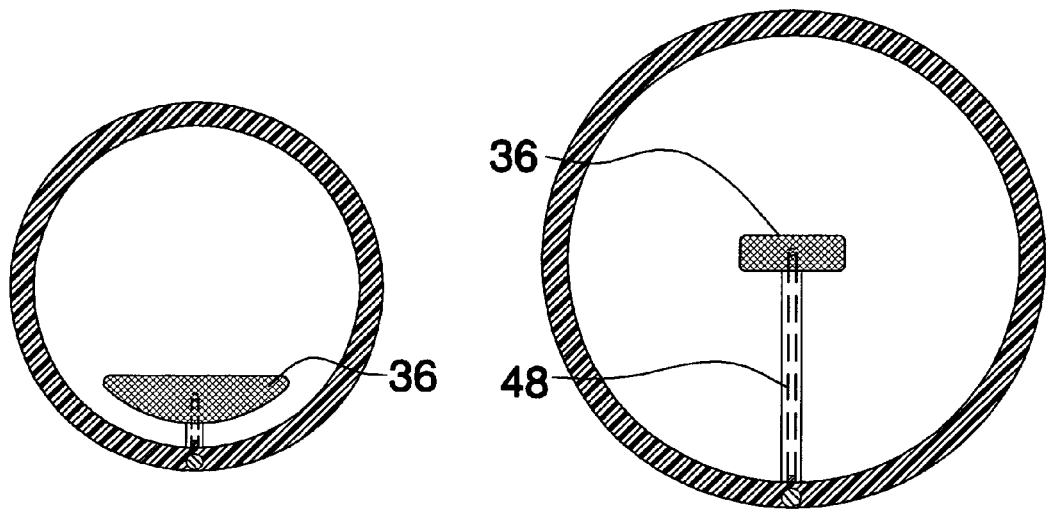
FIG. 5 is a cross-sectional view taken along line 5—5 of FIG. 2 of the present invention.
FIG. 6 is a cross-sectional view taken along line 6—6 of FIG. 4 of the present invention.
Figure 7:
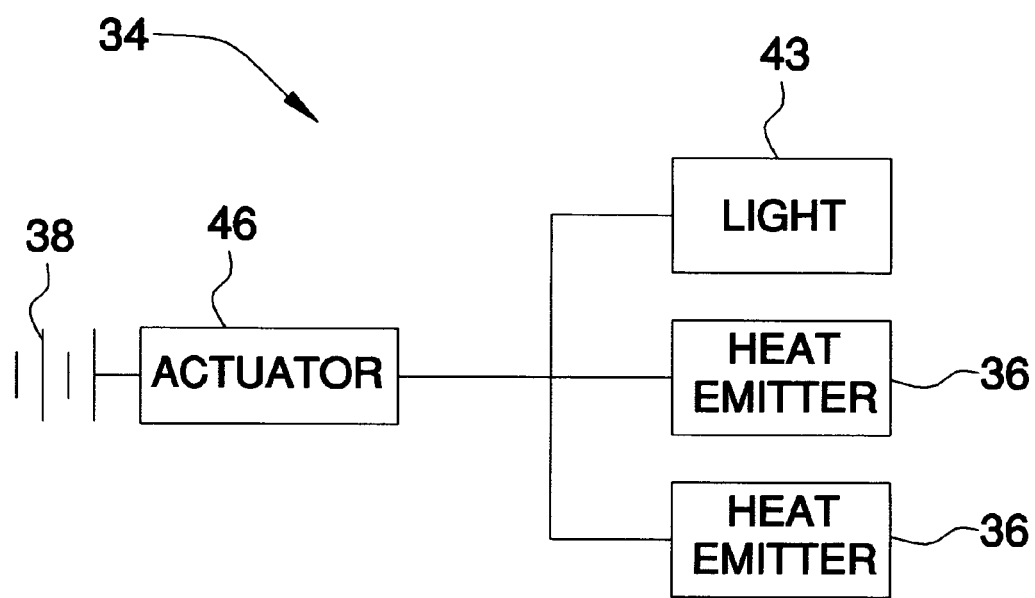
FIG. 7 is a schematic view of a heating apparatus of the present invention.

With reference now to the drawings, and in particular to FIGS. 1 through 7 thereof, a new scope cover device embodying the principles and concepts of the present invention and generally designated by the reference numeral 10 will be described.

As best illustrated in FIGS. 1 through 7, the scope cover and warming assembly 10 generally comprises a tubular covering 12 that includes an open first end 14, an open second end 16 and a peripheral wall 18 extending between the first 14 and second 16 ends. The covering 12 is comprised of a resiliently elastic material such as Neoprene. The covering 12 has an elongated slot 20 therein generally extending from the first end 14 to the second end 16. The tubular covering 12 includes a first portion 22 adjacent to the first end 14, a second portion 24 adjacent to the second end 16 and a central portion 26 located between the first 22 and second 24 portions. The first 22 and second 24 portions each have a greater inner diameter than the central portion 26 to conform to the shape of a typical gun scope. The second portion 24 has a greater inner diameter than the first portion 22. The covering 12 has an opening 28 therein positioned in the central portion 26 and nearer the first end 14 than the second end 16. The covering 12 has an aperture 30 therein positioned in the central portion 26 and between the opening 28 and the first end 14. The opening 28 and aperture 30 are staggered with respect to each other on the covering 12.

A pair of bands 32 is provided. Each of the bands 32 is attached to and extends along a perimeter edge of one of the first 14 and second 16 ends. Each of the bands 32 comprises an elastomeric material.

A heating apparatus 34 is attached to the covering 12 and is adapted for heating an area adjacent to the first 14 and second 16 ends. The heating apparatus 34 includes a pair of heat emitters 36. Each of the heat emitters 36 is positioned adjacent to one of the first 14 and second 16 ends. The heat emitters 36 are preferably comprised of electrically powered heating elements. A power supply 38 is electrically coupled to each of the heat emitters 36. A housing 40 is attached to the covering 12 and includes a door 42 that is removable from the housing 40 for selectively accessing an interior of the housing 40. The housing 40 is located on the central portion 26 of the covering 12. The power supply 38 preferably comprises at least one battery 44 that is removably positionable in the housing 40. An actuator 46 is operationally coupled to the power supply 38 for selectively turning the heat emitters 36 on or off. A light 43 may be mounted on the housing 40 and electrically coupled to the actuator so that the light 43 indicates when the heat emitters 36 are on. Each of a pair of mounts 48 is provided. Each of the mounts 48 is attached to one of the bands 32. The mounts 48 have a free end 50 biased inward toward the covering 12. Constructing the mounts 48 of a resiliently bendable material, such as a metal, which has a bend therein to bias the free ends 50 inward, may accomplish this. Each of the heat emitters 36 is mounted on one of the free ends 50.

At least one fastener 52 is positioned on the covering 12 for selectively closing the slot 20. The fastener 52 includes a strap 54 that may be attached to the covering with a hook and loop securing means 56. The at least one fastener 52 preferably includes at least two fasteners 52.

In use, the covering 12 is removably positioned on a gun scope so that each of the heat emitters 36 abuts an opposite end of the gun scope. The heat emitter 36 positioned adjacent to the second end 16 of the covering 12 is preferably centrally located which places it in a position that will not distort the image being viewed. The opening 28 and aperture 30 allow for adjusting the dials of the scope. The heat emitters 36 prevent the lenses of the scope from fogging over.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A heater and cover combination assembly for removably positioning on a gun scope, said assembly including:
    a tubular covering including an open first end, an open second end and a peripheral wall extending between said first and second ends, said covering having an elongated slot therein generally extending from said first end to said second end, said tubular covering including a first portion adjacent to said first end, a second portion adjacent to said second end and a central portion located between said first and second portions, said first and second portions each having a greater inner diameter than said central portion;
    a pair of bands, each of said bands being attached to and extending along a perimeter edge of one of said first and second ends, each of said bands comprising an elastomeric material;
    a heating apparatus being attached to said covering and being adapted for heating an area adjacent to said first and second ends;
        a pair of heat emitters, each of said heat emitters being positioned adjacent to one of said first and second ends;
        a power supply being electrically coupled to each of said heat emitters; and
    wherein said covering may be removably positioned on a gun scope such that each of said heat emitters abuts an opposite end of the gun scope.

2. The assembly according to claim 1, wherein said covering is comprised of a resiliently elastic material.

3. The assembly according to claim 2, wherein said tubular covering includes a first portion adjacent to said first end, a second portion adjacent to said second end and a central portion located between said first and second portions, said first and second portions each having a greater inner diameter than said central portion, said covering having an opening therein positioned in said central portion and nearer said first end than said second end.

4. The assembly according to claim 3, wherein said covering has an aperture therein positioned in said central portion and between said opening and said first end, said opening and aperture being staggered with respect to each other on said covering.

5. The assembly according to claim 1, wherein said second portion has a greater inner diameter than said first portion.

6. The assembly according to claim 1, wherein said covering has an opening therein positioned in said central portion and nearer said first end than said second end.

7. The assembly according to claim 6, wherein said covering has an aperture therein positioned in said central portion and between said opening and said first end, said opening and aperture being staggered with respect to each other on said covering.

8. The assembly according to claim 1, wherein said heating apparatus further includes a housing being attached to said covering, said covering including door being removable from said housing for selectively accessing an interior of said housing, said housing being located on said central portion of said covering, said power supply comprising a battery being removably positionable in said housing.

9. The assembly according to claim 8, wherein said heating apparatus further includes an actuator being operationally coupled to said power supply for selectively turning said heat emitters on or off.

10. The assembly according to claim 1, wherein said heating apparatus further includes an actuator being operationally coupled to said power supply for selectively turning said heat emitters on or off.

11. The assembly according to claim 1, wherein said heating assembly further includes a pair of mounts, each of said mounts being attached to one of said bands, each of said mounts having a free end biased inward toward said covering, each of said heat emitters being mounted on one of said free ends.

12. The assembly according to claim 1, wherein said heating apparatus further includes a housing being attached to said covering, said covering including a door being removable from said housing for selectively accessing an interior of said housing, said power supply comprising a battery being removably positionable in said housing.

13. The assembly according to claim 1, further including at least one fastener being positioned on said covering for selectively closing said slot.

14. A heater and cover combination assembly for removably positioning on a gun scope, said assembly including:
    a tubular covering including an open first end an open second end and a peripheral wall extending between said first and second ends, said covering being comprised of a resiliently elastic material, said covering having an elongated slot therein generally extending from said first end to said second end, said tubular covering including a first portion adjacent to said first end, a second portion adjacent to said second end and a central portion located between said first and second portions, said first and second portions each having a greater inner diameter than said central portion, said second portion having a greater inner diameter than said first portion, said covering having an opening therein positioned in said central portion and nearer said first end than said second end, said covering having an aperture therein positioned in said central portion and between said opening and said first end, said opening and aperture being staggered with respect to each other on said covering;

a pair of bands, each of said bands being attached to and extending along a perimeter edge of one of said first and second ends, each of said bands comprising an elastomeric material;

a heating apparatus being attached to said covering and being adapted for heating an area adjacent to said first and second ends, said heating apparatus including;

a pair of heat emitters, each of said heat emitters being positioned adjacent to one of said first and second ends;

a power supply being electrically coupled to each of said heat emitters, a housing being attached to said covering, said covering including a door being removable from said housing for selectively accessing an interior of said housing, said housing being located on said central portion of said covering, said power supply comprising a battery being removably positionable in said housing;

an actuator being operationally coupled to said power supply for selectively turning said heat emitters on or off;

a pair of mounts, each of said mounts being attached to one of said bands, each of said mounts having a free end biased inward toward said covering, each of said heat emitters being mounted on one of said free ends;

at least one fastener being positioned on said covering for selectively closing said slot; and wherein said covering may be removably positioned on a gun scope such that each of said heat emitters abuts an opposite end of the gun scope.

15. A heater and cover combination assembly for removably positioning on a gun scope, said assembly including:

a tubular covering including an open first end, an open second end and a peripheral wall extending between said first and second ends, said covering having an elongated slot therein generally extending from said first end to said second end;

a heating apparatus being attached to said covering and being adapted for heating an area adjacent to said first and second ends;

a pair of heat emitters, each of said heat emitters being positioned adjacent to one of said first and second ends;

a power supply being electrically coupled to each of said heat emitters, a housing being attached to said covering, said covering including a door being removable from said housing for selectively accessing an interior of said housing, said power supply comprising a battery being removably positionable in said housing; and wherein said covering may be removably positioned on a gun scope such that each of said heat emitters abuts an opposite end of the gun scope.

16. The assembly according to claim 15, wherein said covering is comprised of a resiliently elastic material.

17. The assembly according to claim 15, further including a pair of bands, each of said bands being attached to and extending along a perimeter edge of one of said first and second ends, each of said bands comprising an elastomeric material.

18. The assembly according to claim 17, wherein said beating assembly further includes a pair of mounts, each of said mounts being attached to one of said bands, each of said mounts having a free end biased inward toward said covering, each of said heat emitters being mounted on one of said free ends.

19. The assembly according to claim 15, wherein said heating apparatus further includes an actuator being operationally coupled to said power supply for selectively turning said heat emitters on or off.

20. The assembly according to claim 15, further including at least one fastener being positioned on said covering for selectively closing said slot.

\* \* \* \* \*